(12) United States Patent
Joos et al.

(10) Patent No.: US 12,386,406 B2
(45) Date of Patent: Aug. 12, 2025

(54) POWER SUPPLY SYSTEM FOR DETECTING A RAIL VIOLATION IN A MULTI-RAIL SEQUENCE

(71) Applicant: SEMICONDUCTOR COMPONENTS INDUSTRIES, LLC, Scottsdale, AZ (US)

(72) Inventors: Dieter Jozef Joos, Nieuwenrode (BE); Philippe Debosque, Toulouse (FR); Philippe Quarmeau, Colomiers (FR)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 55 days.

(21) Appl. No.: 18/344,470

(22) Filed: Jun. 29, 2023

(65) Prior Publication Data

US 2025/0004523 A1 Jan. 2, 2025

(51) Int. Cl.
| | | |
|---|---|---|
| G06F 11/30 | (2006.01) | |
| G06F 1/28 | (2006.01) | |
| G06F 1/3206 | (2019.01) | |
| G06F 1/3237 | (2019.01) | |
| G06F 1/30 | (2006.01) | |

(52) U.S. Cl.
CPC .............. *G06F 1/28* (2013.01); *G06F 1/3206* (2013.01); *G06F 1/3237* (2013.01); *G06F 1/30* (2013.01)

(58) Field of Classification Search
CPC ......... G06F 1/28; G06F 1/3206; G06F 1/3237
USPC ....................................................... 713/340
See application file for complete search history.

(56) References Cited

U.S. PATENT DOCUMENTS

| | | | | |
|---|---|---|---|---|
| 6,316,924 B1* | 11/2001 | Stapleton | ................ | G05F 3/222 323/273 |
| 9,898,970 B2* | 2/2018 | Kang | .................... | G09G 3/3291 |
| 10,013,042 B1* | 7/2018 | Abhishek | .................. | G06F 1/28 |
| 10,367,499 B2* | 7/2019 | Hoogzaad | ............ | G06F 11/3055 |
| 10,877,541 B1* | 12/2020 | Benjamin | .............. | G11C 16/10 |
| 11,789,509 B2* | 10/2023 | Huang | ....................... | G06F 1/26 713/300 |
| 12,038,799 B2* | 7/2024 | Sole | ......................... | H02J 1/084 |
| 2006/0149396 A1* | 7/2006 | Templeton | ........ | H02J 13/00002 700/22 |
| 2007/0234095 A1* | 10/2007 | Chapuis | .................. | G06F 1/329 713/340 |
| 2010/0325325 A1* | 12/2010 | Fernald | ............... | H02M 3/1584 710/110 |

(Continued)

*Primary Examiner* — Volvick Derose
(74) *Attorney, Agent, or Firm* — Brake Hughes Bellermann LLP

(57) ABSTRACT

In some aspects, a power supply system includes a plurality of power supply devices configured to be connected to an integrated circuit, where a power supply device of the plurality of power supply devices includes a voltage regulator configured to generate a rail voltage, and an internal diagnostic circuit. The internal diagnostic circuit is configured to detect activation of an enable signal to activate the plurality of power supply devices according to an activation power sequence, detect a rail violation of the activation power sequence in response to a value of the rail voltage at a first time, not satisfying a first condition defined by a voltage threshold, or at a second time, not satisfying a second condition defined by the voltage threshold. In response to the rail violation being detected, the internal diagnostic circuit is configured to activate an interrupt signal.

20 Claims, 9 Drawing Sheets

(56) References Cited

U.S. PATENT DOCUMENTS

| | | | |
|---|---|---|---|
| 2013/0132741 A1* | 5/2013 | Chen | G06F 1/26 |
| | | | 713/300 |
| 2015/0188407 A1* | 7/2015 | Golder | H02M 1/088 |
| | | | 307/31 |
| 2018/0088649 A1* | 3/2018 | Cheung | G06F 1/3296 |
| 2019/0253049 A1* | 8/2019 | Yan | H03K 17/22 |
| 2021/0055921 A1* | 2/2021 | Sebot | G06F 9/30047 |
| 2021/0200693 A1* | 7/2021 | Benjamin | G11C 5/148 |
| 2021/0373636 A1* | 12/2021 | Thibaut | G06F 1/28 |
| 2022/0155807 A1* | 5/2022 | Seok | G06F 1/26 |

\* cited by examiner

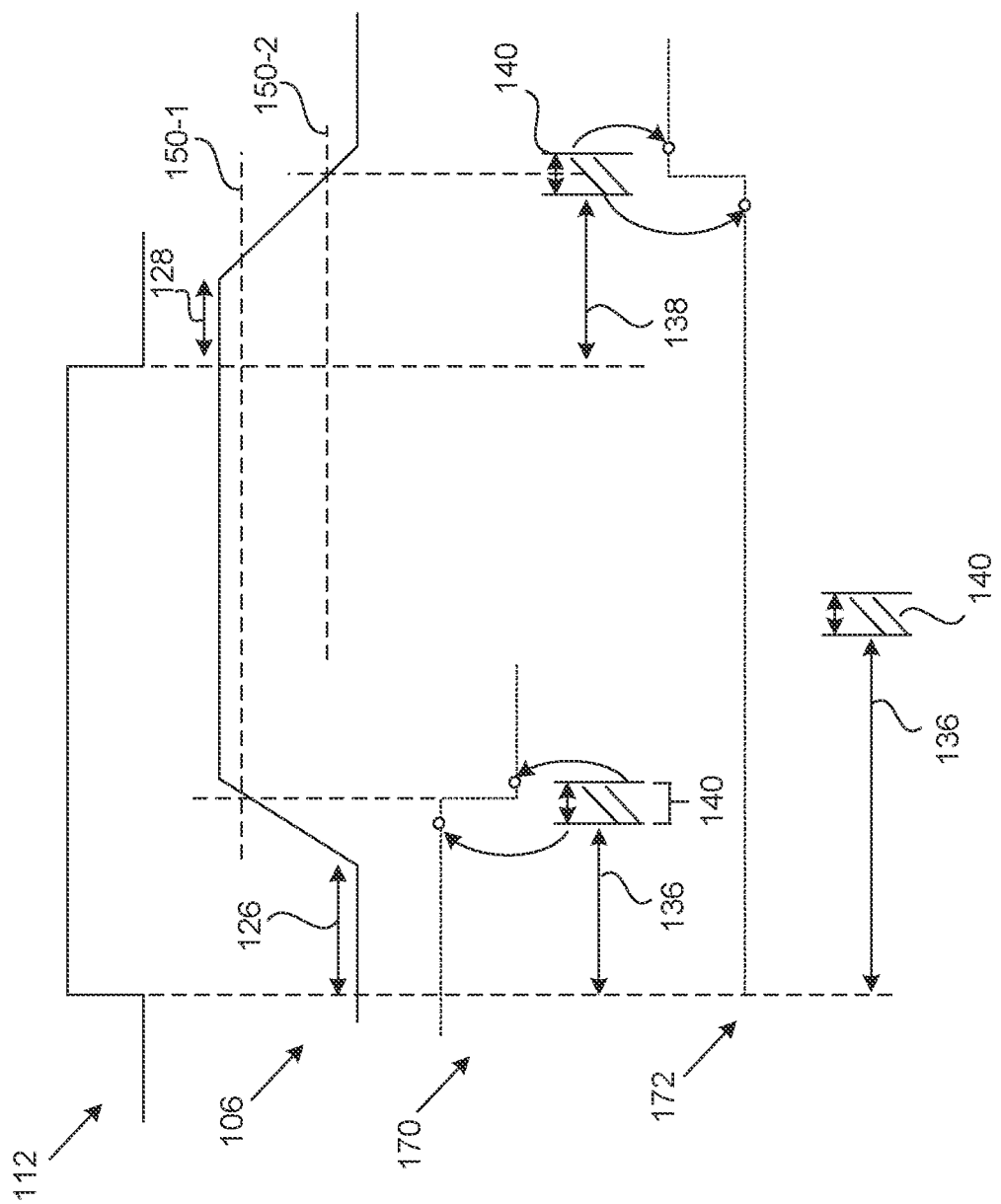

400

402 In response to activation of an enable signal to activate the power system according to an activation power sequence, activating a power supply device to generate a rail voltage

404 Detecting a rail violation to the activation power sequence in response to a value of the rail voltage: at a first time, not satisfying a first condition defined by a voltage threshold, or at a second time, not satisfying a second condition defined by the voltage threshold

406 In response to the rail violation being detected, activating an interrupt signal, the interrupt signal configured to cause an integrated circuit to operate in a safe state

FIG. 4

POWER SUPPLY SYSTEM FOR DETECTING A RAIL VIOLATION IN A MULTI-RAIL SEQUENCE

BACKGROUND

An integrated circuit (e.g., a system-on-chip) may use multiple voltage supply rails that supply power to the integrated circuit. The voltage supply rails may power up and power down in a pre-defined sequence. Deviating from the predefined sequence may impact reliability and functional safety of the integrated circuit.

SUMMARY

In some aspects, the techniques described herein relate to a power supply system, including: a plurality of power supply devices configured to be connected to an integrated circuit, a power supply device of the plurality of power supply devices including: a voltage regulator configured to generate a rail voltage; and an internal diagnostic circuit configured to: detect activation of an enable signal to activate the plurality of power supply devices according to an activation power sequence; detect a rail violation of the activation power sequence in response to a value of the rail voltage: at a first time, not satisfying a first condition defined by a voltage threshold, or at a second time, not satisfying a second condition defined by the voltage threshold; and in response to the rail violation being detected, activate an interrupt signal.

In some aspects, the techniques described herein relate to a power supply device including: a voltage regulator configured to generate a rail voltage; and an internal diagnostic circuit configured to: detect activation of an enable signal to activate a plurality of power supply devices according to an activation power sequence; detect a rail violation of the activation power sequence in response to a value of the rail voltage: at a first time, not satisfying a first condition defined by a voltage threshold, or at a second time, not satisfying a second condition defined by the voltage threshold; and in response to the rail violation, activate an interrupt signal.

In some aspects, the techniques described herein relate to a method of monitoring a power sequence of a power supply system, the method including: in response to activation of an enable signal to activate a power supply system according to an activation power sequence, activating a power supply device to generate a rail voltage; detecting a rail violation of the activation power sequence in response to a value of the rail voltage: at a first time, not satisfying a first condition defined by a voltage threshold, or at a second time, not satisfying a second condition defined by the voltage threshold; and in response to the rail violation being detected, activating an interrupt signal.

BRIEF DESCRIPTION OF THE DRAWINGS

FIG. 1E illustrates a diagram depicting example signals for detecting a rail violation by a power supply device.

FIG. 4 illustrates a flowchart depicting example operations of a power supply device for detecting a rail violation.

DETAILED DESCRIPTION

Figure 1A:
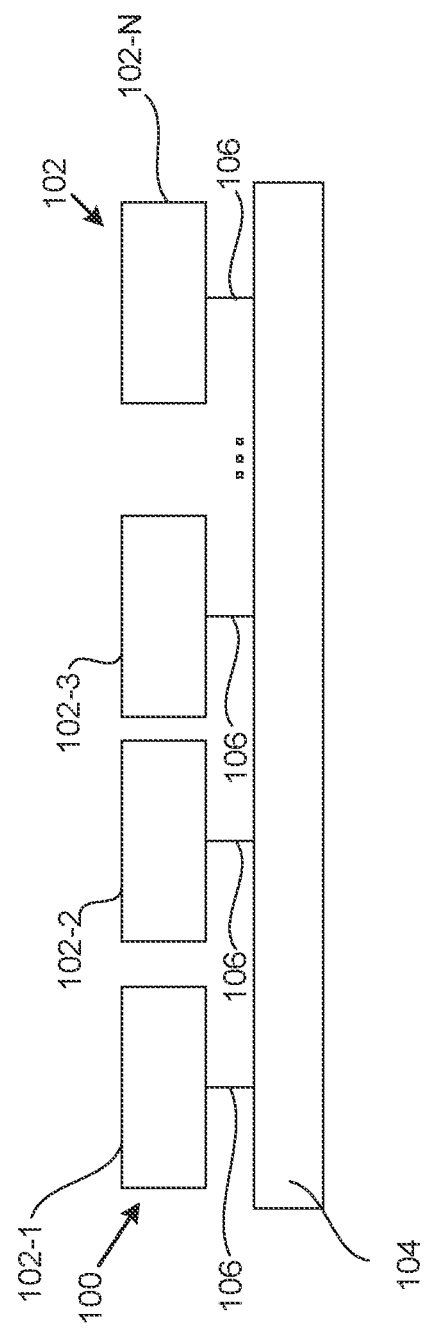
FIG. 1A illustrates a power supply system for detecting a rail violation of a power sequence of a plurality of power supply devices.

This description relates to a power supply system configured to detect, by an individual power supply device, a rail violation of a power sequence of a plurality of power supply devices connected to an integrated circuit (e.g., a system-on-chip (SoC)). For example, the power supply system may include a plurality of power supply devices (e.g., point of load (POL) regulators), where each power supply device is configured to generate a separate rail voltage that is used by the integrated circuit. In response to an enable signal, the power supply devices may activate (e.g., power up) and deactivate (e.g., power down) in a power sequence (e.g., pre-defined sequence) that defines the timing of when a power supply device is activated. For example, the power sequence may include activating a first rail voltage, which is followed by a second rail voltage, and then followed by a third rail voltage. Deviating from the power sequence may be referred to as a rail violation (e.g., the second rail voltage powers up before the first rail voltage reaches its target value). In some systems, rail violations may impact reliability and/or functional safety of the integrated circuit.

A power supply device may include a sequence delay counter and a voltage regulator configured to generate the rail voltage. The sequence delay counter may trigger the voltage regulator to activate or deactivate according to programmable counter values such as a power-up delay value and/or a power-down delay value. The sequence delay counter may receive the enable signal, and, in response to activation of the enable signal, the sequence delay counter may trigger the voltage regulator to activate (e.g., power-up) when the time (from receipt of the activation of the enable signal) corresponds to the power-up delay value, which causes the rail voltage to increase to its target value. In response to deactivation of the enable signal, the sequence delay counter may trigger the voltage regulator to deactivate (e.g., power-down) when the time (from receipt of the deactivation of the enable signal) corresponds to the power-down delay value, which causes the rail voltage to decrease.

The power system discussed herein uses the power supply devices themselves to monitor, control, and/or diagnose the power sequence, thereby providing a more flexible, easier-to-implement power system that may avoid using a central management unit (e.g., power management integrated circuit (PMIC)) to monitor and control the power sequence. In some examples, a central management unit may be customized to a certain integrated circuit, and, if the central management unit controls and monitors the power sequence of the power system, implementing a change to the power system (e.g., replacing a power supply device, etc.) may be relatively difficult.

Instead of using a central management unit, in some implementations, each power supply device includes an internal diagnostic circuit configured to detect a rail violation of its respective rail voltage (e.g., during activation and deactivation of the power system, and, in some examples, when the rail voltage is active), and, when detected, the internal diagnostic circuit may generate an interrupt signal (e.g., safe state signal), which may cause the integrated circuit to operate in a safe state. For example, the internal diagnostic circuit may detect whether its respective rail voltage has started up too early or too late in the power sequence by monitoring the rail voltage during a specified monitoring window and/or at specific times.

In response to activation of the enable signal, the internal diagnostic circuit may detect whether a value of the rail voltage satisfies a first condition defined by a first voltage threshold (e.g., an undervoltage threshold) at a first time (e.g., the start of the monitoring window) to ensure that the power supply device has not started-up too early. In some examples, the value of the rail voltage being equal to or greater than the first voltage threshold may indicate a rail violation (e.g., started power up too early). Also, during activation, the internal diagnostic circuit may detect whether the value of the rail voltage satisfies a second condition defined by the first voltage threshold at a second time (e.g., the end of the monitoring window) to ensure that the power supply device has not started up too late. The value of the rail voltage being equal to or less than the first voltage threshold at the second time may indicate a rail violation (e.g., powered up too late).

In response to deactivation of the enable signal, the internal diagnostic circuit may detect whether the value of the rail voltage satisfies a first condition defined by a second voltage threshold (e.g., a disabled threshold) at a first time (e.g., the start of the monitoring window) to ensure that the power supply device has not powered down too early. At the first time, the value of the rail voltage being equal to or less than the second voltage threshold may indicate a rail violation (e.g., powered down too early). During deactivation, the internal diagnostic circuit may detect whether the value of the rail voltage satisfies a second condition defined by the second voltage threshold at a second time (e.g., the end of the monitoring window) to ensure that the power supply device has not powered down too late. At the second time, the value of the rail voltage being equal to or greater than the second voltage threshold may indicate a rail violation (e.g., powered down too late). These and other features are further described with reference to the figures.

FIGS. 1A through 1F illustrate a power supply system 100 configured to provide rail voltages 106 to an integrated circuit 104. In some examples, the integrated circuit 104 includes a system-on-chip (SoC). At least one (e.g., each) power supply device 102 may monitor its respective rail voltage 106 to detect a rail violation 134 to the power sequence of the power supply system 100. In response to the detection of a rail violation 134, a power supply device 102 may activate an interrupt signal 110, which causes the integrated circuit 104 to operate in a safe state.

A power sequence is the timing order in which the power supply devices 102 are activated (e.g., powered up) or deactivated (e.g., powered down). A rail violation 134 may indicate an abnormality to the power sequence (e.g., a particular rail voltage 106 being powered up (or down) too early or too late in the power sequence). Each of the power supply devices 102 may be configured to detect whether its respective rail voltage 106 is being powered up (or powered down) at a time that is too early or too late in the power sequence. The power supply system 100 may not include or use a central management unit (e.g., a power management integrated circuit (PMIC)) to monitor and control the power sequence, which may provide more flexible and easier-to-implement power supply devices 102.

The power supply system 100 includes a plurality of power supply devices 102 configured to generate a plurality of rail voltages 106. The rail voltages 106 may be the supply voltages used by the integrated circuit 104. In some examples, each power supply device 102 has a voltage output that is connected to the integrated circuit 104. A power supply device 102 may be any type of electrical device that generates a rail voltage 106 from a supply voltage 116. In some examples, the power supply devices 102 share a supply voltage 116 (e.g., a common supply voltage). Each power supply device 102 may receive the supply voltage 116, and, when activated, may generate separate (and, in some examples, different) rail voltages 106. During activation of a power supply device 102, a rail voltage 106 increases from a minimum voltage (e.g., zero volts, standby voltage, etc.) to a target voltage. During deactivation of one of the power supply devices 102, a rail voltage decreases from its target voltage to its minimum voltage. In some examples, the power supply devices 102 include voltage regulators (e.g., voltage converters). In some examples, the power supply devices 102 include direct current (DC)-DC converters. In some examples, the power supply devices 102 include point-of-load (POL) voltage regulators.

Figure 1B:
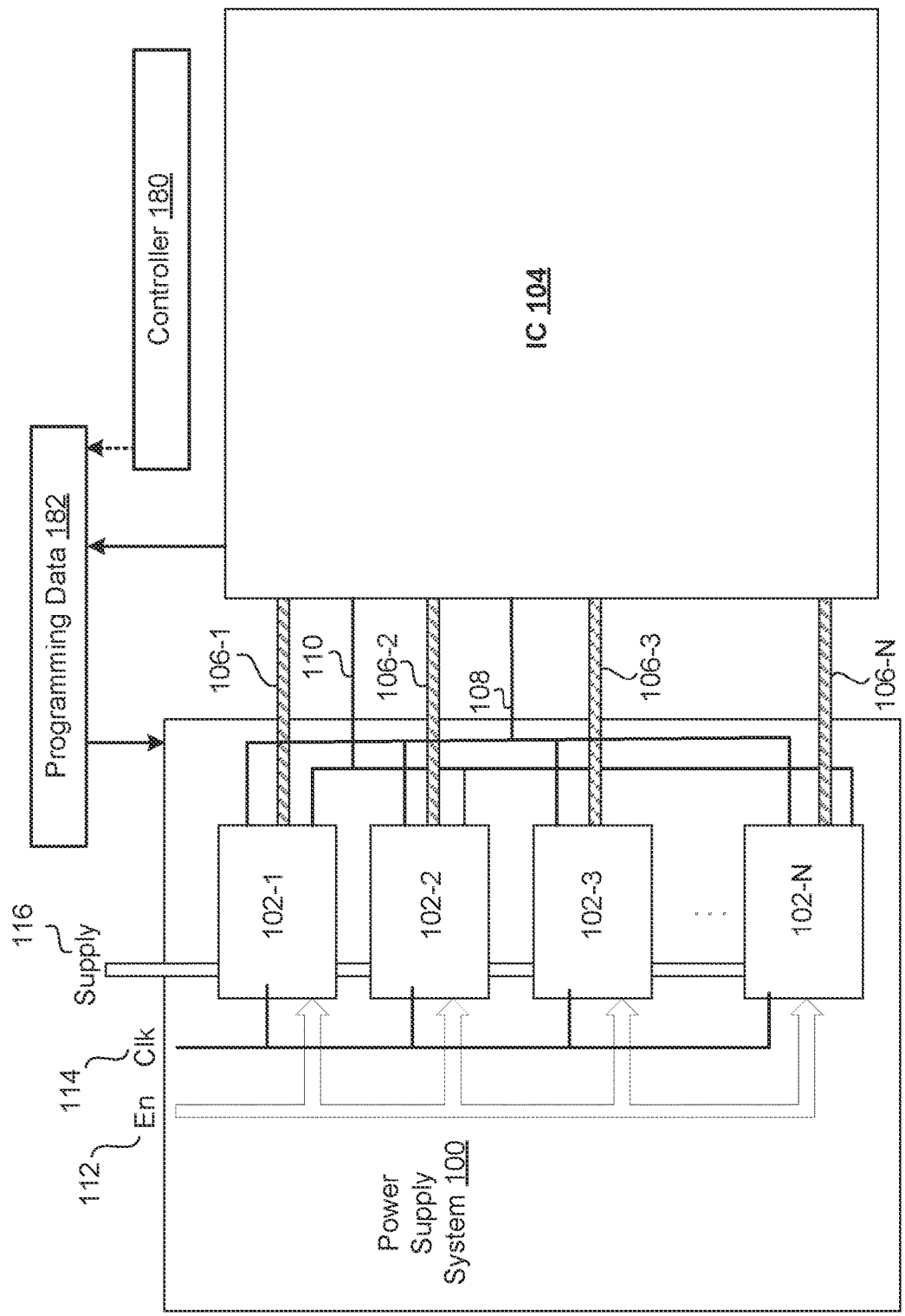
FIG. 1B illustrates an example of the power supply system.

As shown in FIG. 1B, the power supply system 100 may include a power supply device 102-1, a power supply device 102-2, and a power supply device 102-3 through power supply device 102-N. It is noted that the power supply system 100 may include any number of power supply devices 102 such as two, three, four, or any number greater than four. A power supply device 102 may refer to any of the power supply devices 102-1 through 102-N. Each power supply device 102 has an output (e.g., a terminal, pin, etc.) configured to provide a respective rail voltage 106 to a connected device (e.g., the integrated circuit 104). As shown in FIG. 1B, the power supply device 102-1 generates a rail voltage 106-1, the power supply device 102-2 generates a rail voltage 106-2, the power supply device 102-3 generates a rail voltage 106-3, and the power supply device 102-N generates a rail voltage 106-N.

Each power supply device 102 may receive an enable signal 112 as an input. The enable signal 112 may be a common enable signal between the power supply devices 102. For example, each power supply device 102 may receive the enable signal 112 (e.g., the same enable signal). Activation of the enable signal 112 causes the power supply devices 102 to be activated according to an activation power sequence. Activation of the enable signal 112 may include a transition from a first voltage level to a second voltage level (e.g., a rising edge). The activation power sequence may indicate that power supply device 102-1 is activated first, and, after the rail voltage 106-1 has reached its target value, the power supply device 102-2 is activated, which is followed by the activation of power supply device 102-3, and so forth. Deactivation of the enable signal 112 causes the power supply devices 102 to be deactivated according to a deactivation power sequence. Deactivation of the enable signal 112 may include a transition from the second voltage level to the first voltage level (e.g., a falling edge). The deactivation power sequence may indicate that power supply device 102-1 is deactivated first, and, after the rail voltage 106-1 has reached its minimum value, the power supply device 102-2 is deactivated, which is followed by the deactivation of power supply device 102-3, and so forth. In some examples, the deactivation power sequence has a timing order that is the same as the activation power sequence. In some examples, the deactivation power sequence has a timing order that is different from the activation power sequence.

When the enable signal 112 is activated, the power supply devices 102 detect the transition (e.g., the rising edge) of the enable signal 112, and a sequence delay counter 120, included within each power supply device 102, controls when a respective rail voltage 106 is activated (e.g., starts to increase to its target voltage level). When the enable signal 112 is deactivated, the power supply devices 102 detect the transition (e.g., the falling edge) of the enable signal 112, and the sequence delay counter 120, included within each power supply device 102, controls when a respective rail voltage 106 is deactivated (e.g., starts to decrease to a minimum voltage).

Each power supply device 102 is configured to receive a clock signal 114 as an input. The clock signal 114 may be a common clock signal for the power supply devices 102. Each power supply device 102 may include an interrupt output (e.g., a terminal, pin, etc.) that provides the interrupt signal 110. The integrated circuit 104 may receive the interrupt signal 110. In some examples, the interrupt signal 110 is a signal common to the power supply device 102. For example, activation of the interrupt signal 110 by any one of the power supply devices 102 may cause the integrated circuit 104 to operate in a safe state. Activation of the interrupt signal 110 may include transitioning from a first voltage level to a second voltage level (e.g., a rising edge). A safe state may be an operating state of the integrated circuit 104. The integrated circuit 104 may operate in a normal operating state when the integrated circuit 104 is functioning normally. Activation of the interrupt signal 110 may cause the integrated circuit 104 to change operating states from a first operating state (e.g., a normal operating state) to a second operating state (e.g., a safe operating state). The integrated circuit 104 in the second operating state may function differently than the integrated circuit 104 in the first operating state.

Each power supply device 102 may activate an interrupt signal 110 in response to the detection of a rail violation 134. The power supply system 100 may include a communication bus 108 connected to the integrated circuit 104 and the power supply devices 102. In some examples, the communication bus 108 includes an inter-integrated circuit (I2C) bus.

Figure 1C:
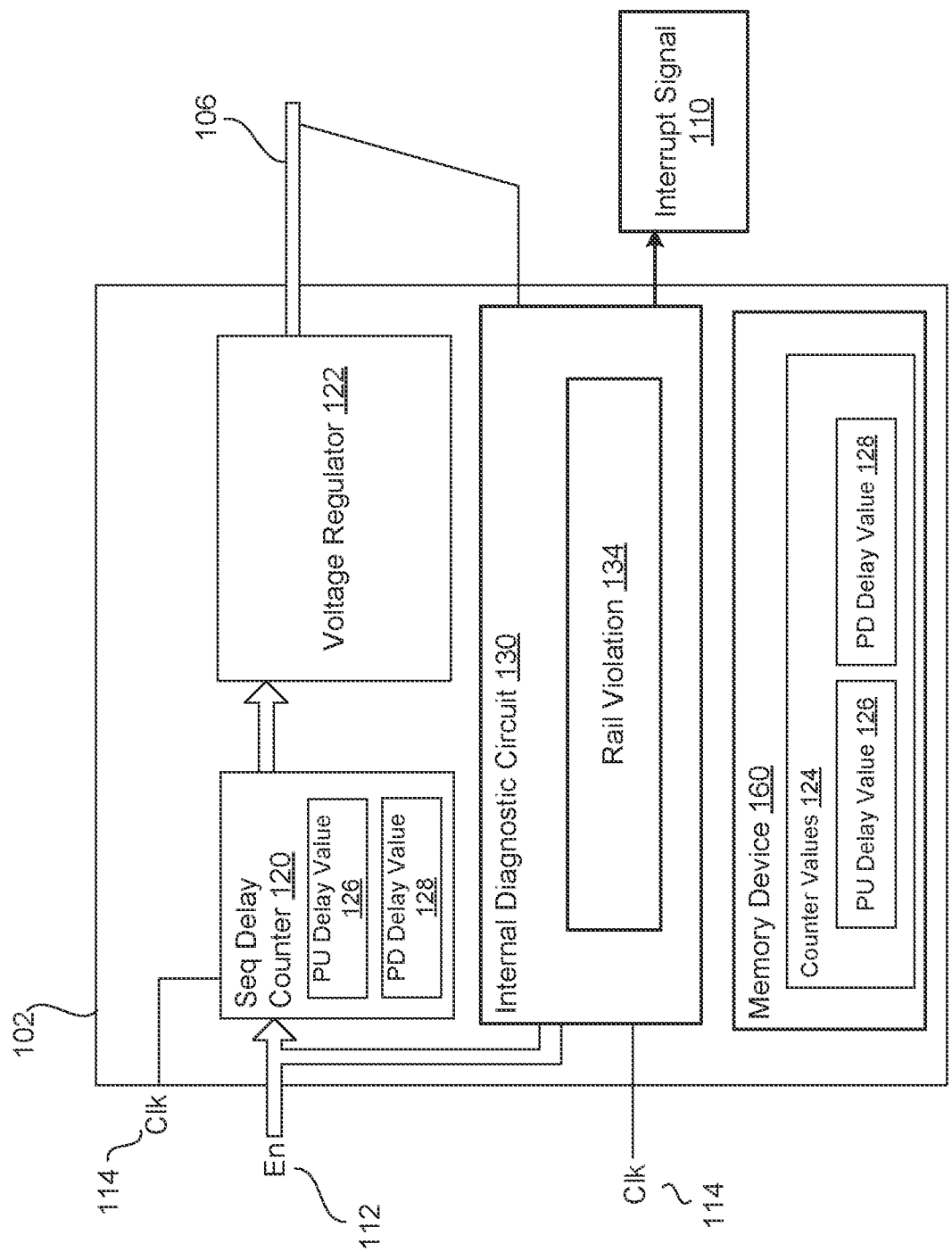
FIG. 1C illustrates an example of a power supply device with an internal diagnostic circuit.

FIG. 1C illustrates an example of a power supply device 102, which may be any of the power supply devices 102 in the power supply system 100. As shown in FIG. 1C, the power supply device 102 includes a sequence delay counter 120 and a voltage regulator 122. The voltage regulator 122 is configured to generate the rail voltage 106 from the supply voltage 116. The sequence delay counter 120 may receive the enable signal 112 and the clock signal 114 and control the timing of when the voltage regulator 122 activates according to the activation power sequence and deactivates according to the deactivation power sequence.

The sequence delay counter 120 may trigger activation (or deactivation) of the voltage regulator 122 based on counter values 124. The counter values may include a power-up delay value 126 and a power-down delay value 128. The power-up delay value 126 may be used during the activation power sequence. The power-down delay value 128 may be used during the deactivation power sequence. The power-up delay value 126 may represent a length of time that the voltage regulator 122 is delayed until the voltage regulator 122 is activated. When the voltage regulator 122 is activated, the rail voltage 106 starts to increase. The power-up delay value 126 may indicate a period of time from detection of the activation of the enable signal 112. In other words, instead of activating the voltage regulator 122 when the activation of the enable signal 112 is detected, the activation of the voltage regulator 122 is delayed by the power-up delay value 126. In response to detecting that the enable signal 112 is activated, the sequence delay counter 120 may delay activation of the voltage regulator 122 according to the power-up delay value 126. When the sequence delay counter 120 triggers activation of the voltage regulator 122, the rail voltage 106 increases to its target value (e.g., to be powered up).

The power-down delay value 128 may represent a length of time that the voltage regulator 122 is delayed until the voltage regulator 122 is deactivated. When the voltage regulator 122 is deactivated, the rail voltage 106 starts to decrease. The power-down delay value 128 may indicate a period of time from detection of the deactivation of the enable signal 112. In other words, instead of deactivating the voltage regulator 122 when the deactivation of the enable signal 112 is detected, the deactivation of the voltage regulator 122 is delayed by the power-down delay value 128. In response to detecting that the enable signal 112 is deactivated, the sequence delay counter 120 may delay deactivation of the voltage regulator 122 according to the power-down delay value 128. For example, the sequence delay counter 120 may trigger deactivation of the voltage regulator 122 in response to the period of time (starting from when the deactivation of the enable signal 112 is detected) being equal to (or greater than) the power-down delay value 128, which causes the rail voltage 106 to decrease from its target value (e.g., to be powered down).

In some examples, the power supply device 102 includes a memory device 160 configured to store the counter values 124. In some examples, the memory device 160 includes a field programmable memory device. In some examples, the memory device 160 includes a one-time programmable (OTP) memory device. In some examples, the power supply device 102 does not include a separate memory device, and the counter values 124 are stored at the sequence delay counter 120.

Figure 1D:
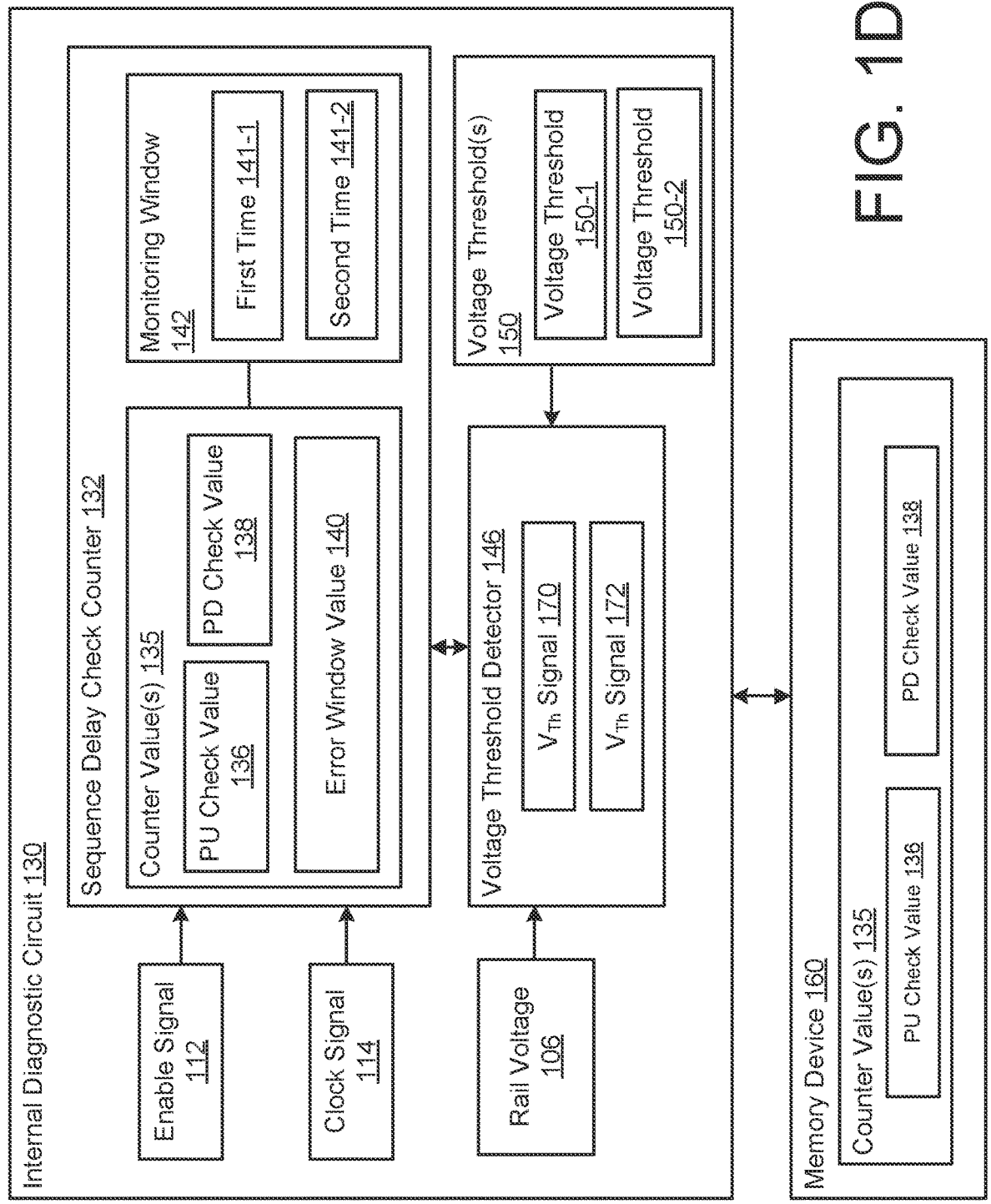
FIG. 1D illustrates an example of the internal diagnostic circuit.

Referring to FIGS. 1C and 1D, the power supply device 102 includes an internal diagnostic circuit 130 configured to detect a rail violation 134 with respect to its rail voltage 106 during the power sequence (e.g., the activation power sequence, the deactivation power sequence), and, when detected, may activate an interrupt signal 110, which causes the integrated circuit 104 to operate in a safe state. For example, when the enable signal 112 is activated (or deactivated), the internal diagnostic circuit 130 may detect whether its respective rail voltage 106 has started-up too early or too late in the power sequence by monitoring the rail voltage 106 at one or more times during a monitoring window 142.

In response to activation of the enable signal 112, the internal diagnostic circuit 130 may detect whether a value of the rail voltage 106 satisfies a first condition defined by a voltage threshold 150-1 at a first time 141-1 (e.g., the start of the monitoring window 142) to ensure that the power supply device 102 has not powered up too early. The voltage threshold 150-1 may be an undervoltage threshold, and the first condition defined by the voltage threshold 150-1 may be that the value of the rail voltage 106 is less than the voltage threshold 150-1 at the first time 141-1. The value of the rail voltage 106 being equal to or greater than the voltage threshold 150-1 at the first time 141-1 may indicate a rail violation 134 (e.g., powered up too early).

During activation, the internal diagnostic circuit 130 may detect whether the value of the rail voltage 106 satisfies a second condition defined by the voltage threshold 150-1 at a second time 141-2 (e.g., the end of the monitoring window 142) to ensure that the power supply device 102 has not powered up too late. The second condition of the voltage threshold 150-1 may be that the value of the rail voltage 106 is greater than the voltage threshold 150-1 at the second time 141-2. The value of the rail voltage 106 being equal to or less than the voltage threshold 150-1 at the second time 141-2 may indicate a rail violation 134 (e.g., powered up too late). In some examples, after a power supply device 102 has been activated (e.g., powered-up), the internal diagnostic circuit 130 may monitor the rail voltage 106 to ensure that the rail voltage 106 is greater than the voltage threshold 150-1. For example, after the power supply device 102 has been activated, the internal diagnostic circuit 130 may detect whether the rail voltage 106 is greater than the voltage threshold 150-1, and, if not, may activate the interrupt signal 110.

In response to deactivation of the enable signal 112, the internal diagnostic circuit 130 may detect whether the value of the rail voltage 106 satisfies a first condition defined by a voltage threshold 150-2 at a first time 141-1 (e.g., the start of the monitoring window 142) to ensure that the power supply device 102 has not powered down too early. In some examples, the voltage threshold 150-2 is a lower threshold (e.g., a disabled threshold). The first condition defined by the voltage threshold 150-2 may be that the value of the rail voltage 106 is greater than the voltage threshold 150-2. The value of the rail voltage 106 being equal to or less than the voltage threshold 150-2 at the first time 141-1 may indicate a rail violation 134 (e.g., powered down too early).

During deactivation, the internal diagnostic circuit 130 may detect whether the value of the rail voltage 106 satisfies a second condition defined by the voltage threshold 150-2 at a second time 141-2 (e.g., the end of the monitoring window 142) to ensure that the power supply device 102 has not powered down too late. The second condition defined by the voltage threshold 150-2 may be that the value of the rail voltage 106 is less than or equal to the voltage threshold 150-2 at the second time 141-2. The value of the rail voltage 106 being equal to or greater than the voltage threshold 150-2 at the second time 141-2 may indicate a rail violation 134 (e.g., powered down too late).

The internal diagnostic circuit 130 includes a sequence delay check counter 132 and a voltage threshold detector 146. The sequence delay check counter 132 may determine when to check for a rail violation 134 (e.g., at the first time 141-1, the second time 141-2) based on counter values 135 associated with the sequence delay check counter 132. The voltage threshold detector 146 may detect whether the value of the rail voltage 106 satisfies a condition (e.g., the first condition, second condition) (e.g., greater, less than, and/or equal to) defined by one or more voltage thresholds 150 (e.g., the voltage threshold 150-1 or the voltage threshold 150-1). In some examples, the voltage threshold detector 146 may activate or deactivate a voltage threshold signal 170 and/or a voltage threshold signal 172 based on a comparison of the value of the rail voltage 106 with the voltage threshold 150-1 and the voltage threshold 150-2.

In further detail, the voltage threshold detector 146 may detect whether the value of the rail voltage 106 is less than a voltage threshold 150-1, and, if so, may activate a voltage threshold signal 170. In some examples, the voltage threshold 150-1 is an undervoltage threshold. In some examples, the voltage threshold 150-1 is used during activation of the power supply device 102. If the voltage threshold detector 146 detects that the value of the rail voltage 106 is equal to or greater than the voltage threshold 150-1, the voltage threshold detector 146 may deactivate the voltage threshold signal 170. The voltage threshold detector 146 may detect whether the value of the rail voltage 106 is less than the voltage threshold 150-2, and, if so, may activate a voltage threshold signal 172. In some examples, the voltage threshold 150-2 is used during deactivation of the power supply device 102. In some examples, the voltage threshold 150-2 is less than the voltage threshold 150-1. If the voltage threshold detector 146 detects that the rail voltage 106 is equal to or greater than the voltage threshold 150-2, the voltage threshold detector 146 may deactivate the voltage threshold signal 172.

The sequence delay check counter 132 may receive the enable signal 112, the clock signal 114, and, in some examples, the voltage threshold signals 170, 172 from the voltage threshold detector 146. The sequence delay check counter 132 may detect a rail violation 134 at the first time 141-1 and the second time 141-2 defined by the counter values 135 using the voltage threshold signal 170 and the voltage threshold signal 172. The counter values 135 may include a power-up check value 136, a power-down check value 138, and an error window value 140. The power-up check value 136 may indicate a first time (e.g., the first time 141-1) from activation of the enable signal 112 to check for a rail violation 134. During activation, the error window value 140 may represent a second time (e.g., the second time 141-2) from the power-up check value 136 to check for a rail violation 134. The power-down check value 138 may indicate a first time (e.g., the first time 141-1) from deactivation of the enable signal 112 to check for a rail violation 134. During deactivation, the error window value 140 may also represent a second time (e.g., the second time 141-2) from the power-down check value 138 to check for a rail violation 134. In some examples, the error window value 140 includes a first error window value indicating a length of time during activation, and a second error window value indicating a length of time during deactivation. In some examples, the second error window value is different from the first error window value. In some examples, the second error window value is the same as the first error window value.

Referring to FIG. 1E, in response to activation of the enable signal 112, the sequence delay counter 120 causes the activation of the voltage regulator 122 to be delayed according to the power-up delay value 126. When the voltage regulator 122 is activated, the rail voltage 106 starts to increase.

In response to activation of the enable signal 112, the sequence delay check counter 132 detects, at a time (e.g., the first time 141-1) indicated by the power-up check value 136, whether or not the voltage threshold signal 170 is activated. In other words, when a period of time starting from the receipt of the enable signal 112 has reached the power-up check value 136, the sequence delay check counter 132 may detect whether or not the voltage threshold signal 170 is activated. If the voltage threshold signal 170 is activated (e.g., which indicates that the value of the rail voltage 106 is less than the voltage threshold 150-1), the sequence delay check counter 132 may determine that the activation power sequence is operating normally (e.g., a rail violation 134 is not detected). If the voltage threshold signal 170 is deactivated (e.g., which indicates that the value of the rail voltage 106 is equal to or greater than the voltage threshold 150-1), the sequence delay check counter 132 may detect a rail violation 134 and activate the interrupt signal 110.

The sequence delay check counter 132 may detect, at a time (e.g., the second time 141-2) defined by the error window value 140, whether or not the voltage threshold signal 170 is activated. In other words, when a period of time starting from the time represented by the power-up check value 136 has reached the error window value 140, the sequence delay check counter 132 may detect whether or not the voltage threshold signal 170 is activated. If the voltage threshold signal 170 is deactivated (e.g., which indicates that the value of the rail voltage 106 is equal to or greater than the voltage threshold 150-1), the sequence delay check counter 132 may determine that the activation power sequence is operating normally (e.g., a rail violation 134 is not detected). If the voltage threshold signal 170 is activated (e.g., which indicates that the value of the rail voltage 106 is less than the voltage threshold 150-1), the sequence delay check counter 132 may detect a rail violation 134 and activate the interrupt signal 110.

In response to deactivation of the enable signal 112, the sequence delay counter 120 causes the deactivation of the voltage regulator 122 to be delayed according to the power-down delay value 128. When the voltage regulator 122 is deactivated, the rail voltage 106 starts to decrease.

In response to deactivation of the enable signal 112, the sequence delay check counter 132 detects, at a time (e.g., the first time 141-1) defined by the power-down check value 138, whether or not the voltage threshold signal 172 is activated. In other words, when a period of time starting from the receipt of deactivation of the enable signal 112 has reached the power-down check value 138, the sequence delay check counter 132 may detect whether or not the voltage threshold signal 172 is activated. If the voltage threshold signal 172 is deactivated (e.g., which indicates that the value of the rail voltage 106 is equal to or greater than the voltage threshold 150-2), the sequence delay check counter 132 may determine that the deactivation power sequence is operating normally (e.g., a rail violation 134 is not detected). If the voltage threshold signal 172 is activated (e.g., which indicates that the value of the rail voltage 106 is less than the voltage threshold 150-2), the sequence delay check counter 132 may detect a rail violation 134 and activate the interrupt signal 110.

During deactivation, the sequence delay check counter 132 may detect, at a time (e.g., the second time 141-2) defined by the error window value 140, whether or not the voltage threshold signal 172 is activated. In other words, when a period of time starting from the time represented by the power-down check value 138 has reached the error window value 140, the sequence delay check counter 132 may detect whether or not the voltage threshold signal 172 is activated. If the voltage threshold signal 172 is activated (e.g., which indicates that the value of the rail voltage 106 is less than the voltage threshold 150-2), the sequence delay check counter 132 may determine that the deactivation power sequence is operating normally (e.g., a rail violation 134 is not detected). If the voltage threshold signal 172 is deactivated (e.g., which indicates that the value of the rail voltage 106 is greater than or equal to the voltage threshold 150-2), the sequence delay check counter 132 may detect a rail violation 134 and activate the interrupt signal 110.

In some examples, the counter values 124 used by the sequence delay counter 120 and/or the counter values 135 used by the sequence delay check counter 132 are field programmable. For example, the sequence delay counter 120 and the sequence delay check counter 132 may be programmable after the power supply device 102 has been manufactured. The memory device 160 may receive programming data 182, where the programming data 182 includes the counter values 124 and/or the counter values 135. In some examples, the programming data 182 may include other configuration data such as the target voltage levels, the power-down voltage levels, the voltage threshold 150-1, and/or the voltage threshold 150-2. The counter values 124 and/or the counter values 135 from the programming data 182 may be stored in the memory device 160 and/or in the sequence delay counter 120, the sequence delay check counter 132, and/or the voltage regulator 122. In some examples, the integrated circuit 104 may transmit the programming data 182 to the power supply devices 102. In some examples, the integrated circuit 104 transmits the programming data 182 via the communication bus 108. In some examples, a controller 180, separate from the integrated circuit 104, may provide the programming data 182 to the power supply devices 102.

In some examples, each power supply device 102 is associated with an identifier that can uniquely identify a respective power supply device 102, and the programming data 182 may include the identifier for a power supply device 102 to be programmed with the counter values 124. In some examples, the identifier is an address that identifies the power supply device 102. In some examples, the programming data 182 includes digital data. In some examples, the programming data 182 includes analog data. In some examples, the addressing via a resistor and an analog-to-digital converter.

Figure 1F:
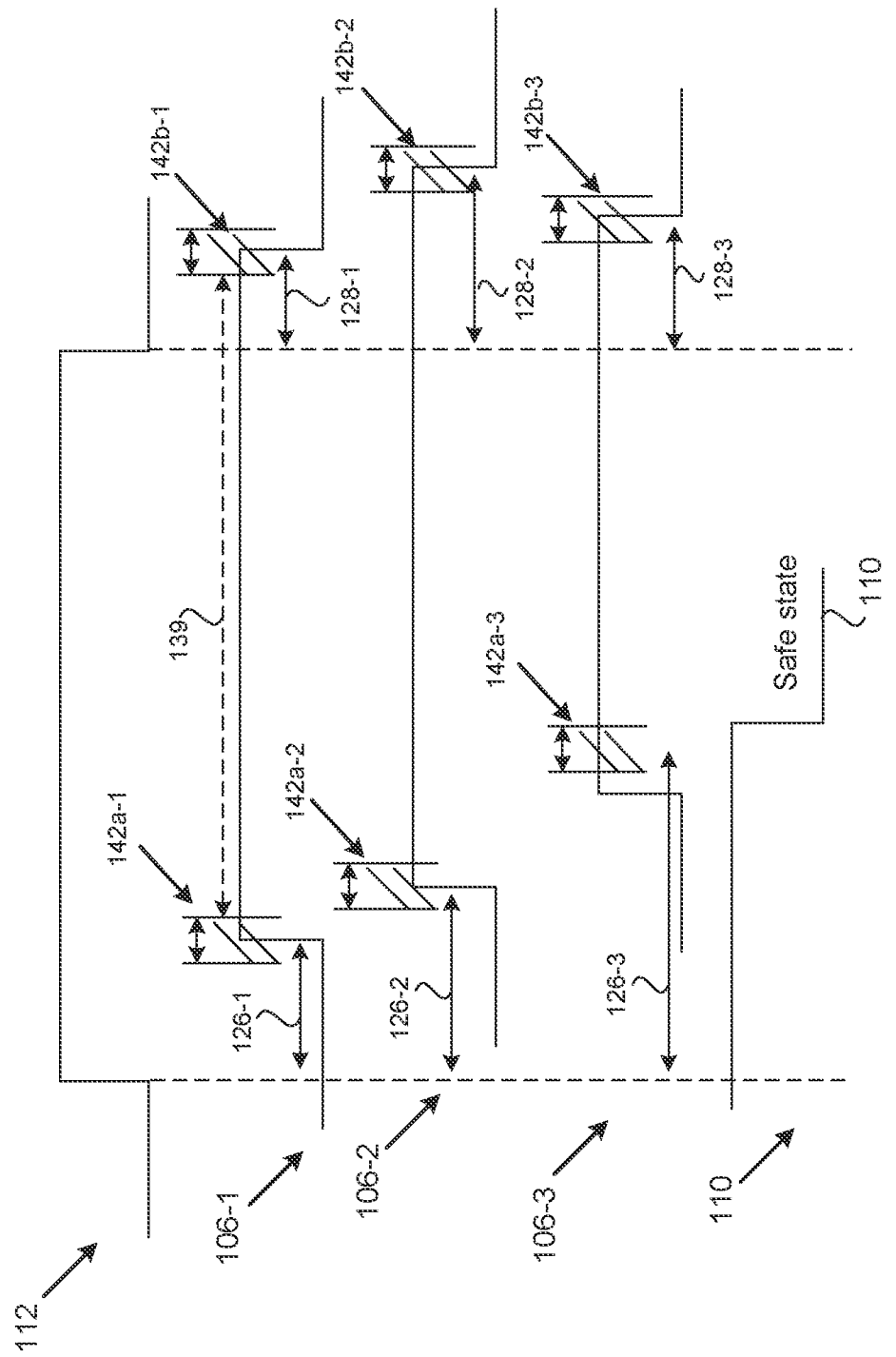
FIG. 1F illustrates a diagram depicting example signals for detecting a rail violation by a plurality of power supply devices.

Referring to FIG. 1F, in response to activation of the enable signal 112, the rail voltage 106-1 is activated at a time represented by a power-up delay value 126-1. The power supply device 102-1 checks for a rail violation 134 on the rail voltage 106-1 during a monitoring window 142a-1 (e.g., at a first time 141-1 and a second time 141-2). Then, the rail voltage 106-2 is activated at a time represented by a power-up delay value 126-2. The power supply device 102-2 checks for a rail violation 134 on the rail voltage 106-2 during a monitoring window 142a-2 (e.g., at a first time 141-1 and a second time 141-2). Then, the rail voltage 106-3 is activated at a time represented by a power-up delay value 126-3. The power supply device 102-3 detects a rail violation 134 on the rail voltage 106-3 during a monitoring window 142a-3 (e.g., at a first time 141-1 and a second time 141-2) and activates the interrupt signal 110. In some examples, after a power supply device 102 has been activated (e.g., powered-up), the internal diagnostic circuit 130 may monitor its respective rail voltage 106 (e.g., 106-1, 106-2, or 106-3) to ensure that the rail voltage 106 is greater than the voltage threshold 150-1. For example, after the power supply device 102-1 has been activated, the internal diagnostic circuit 130 may detect whether the rail voltage 106-1 is greater than the voltage threshold 150-1 during a period 139 (e.g., at one or more times (or continuous monitoring) during the period 139 between the monitoring window 142a-1 and the monitoring window 142b-1), and, if not, may activate the interrupt signal 110. In some examples, the period 139 may be between the second time 141-2 associated with the monitoring window 142a-1 and the first time 141-1 associated with the monitoring window 142b-1.

In response to deactivation of the enable signal 112, the rail voltage 106-1 is deactivated at a time represented by a power-down delay value 128-1. The power supply device 102-1 checks for a rail violation 134 on the rail voltage 106-1 during a monitoring window 142b-1 (e.g., at a first time 141-1 and a second time 141-2). Then, the rail voltage 106-3 is deactivated at a time represented by a power-down delay value 128-3. The power supply device 102-3 checks for a rail violation 134 on the rail voltage 106-3 during a monitoring window 142b-3 (e.g., at a first time 141-1 and a second time 141-2). Then, the rail voltage 106-2 is deactivated at a time represented by a power-up delay value 128-2. The power supply device 102-2 checks for a rail violation 134 on the rail voltage 106-2 during a monitoring window 142b-2 (e.g., at a first time 141-1 and a second time 141-2). In some examples, the monitoring window 142b-1, 142b-2, or 142b-3 has a length that is different from a corresponding monitoring window 142a-1, 142a-2, or 142a-3. In some examples, the monitoring window 142b-1, 142b-2, or 142b-3 has a length that is the same as a corresponding monitoring window 142a-1, 142a-2, or 142a-3.

Figure 2:
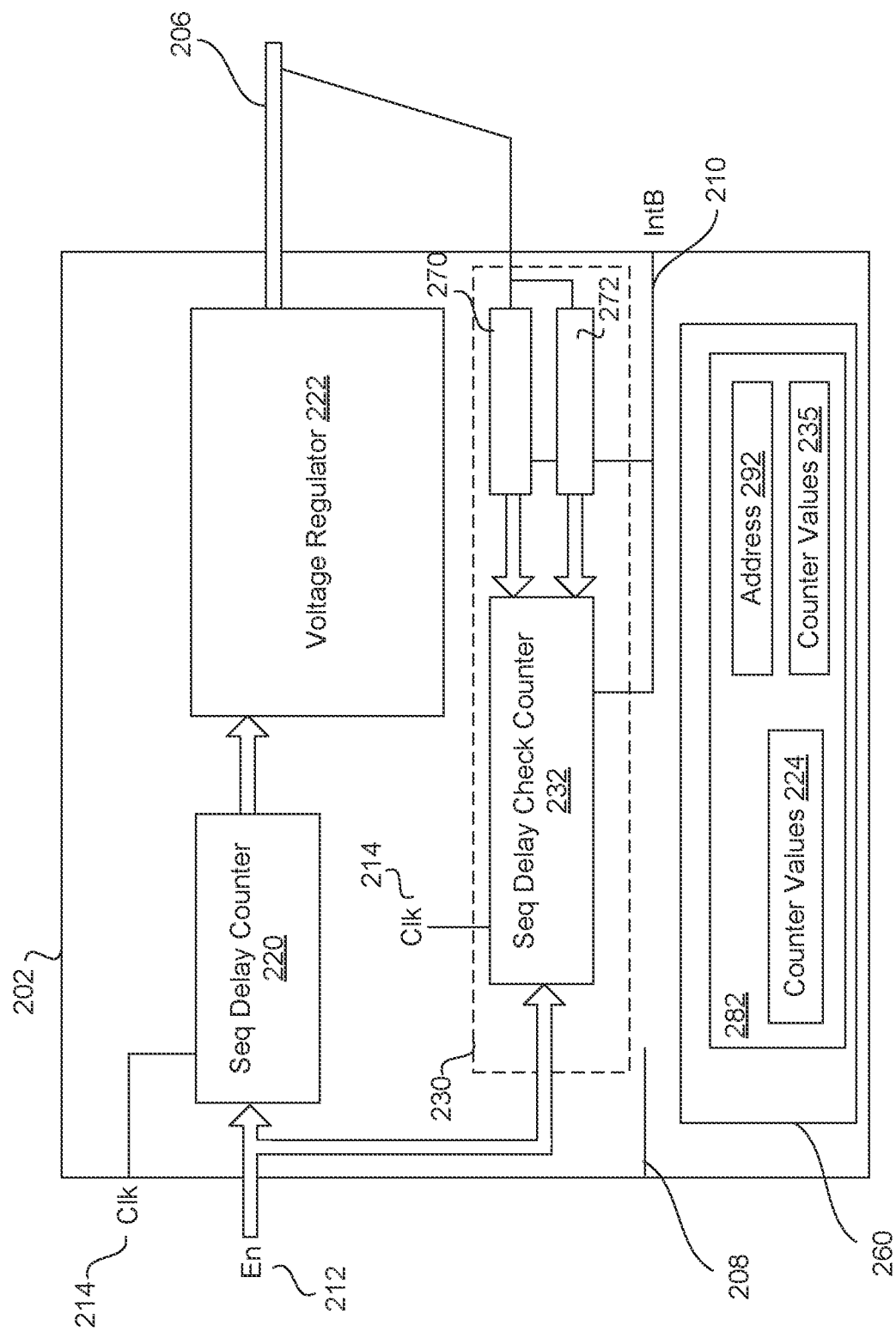
FIG. 2 illustrates an example of a power supply device for detecting a rail violation.

FIG. 2 illustrates an example of a power supply device 202 according to an aspect. The power supply device 202 may be an example of the power supply device 102 of FIGS. 1A to 1F and may include any of the details discussed with reference to those figures. The power supply device 202 includes a sequence delay counter 220, a voltage regulator 222, an internal diagnostic circuit 230, and a memory device 260. The sequence delay counter 220 may receive a clock signal 214 and an enable signal 212, and delay activation (or deactivation) of the voltage regulator 222 according to its counter values. In some examples, the power supply device 202 includes a communication bus 208. The voltage regulator 222 is configured to generate a rail voltage 206. The internal diagnostic circuit 230 may receive the enable signal 212 (and the clock signal 214), and the rail voltage 206, and detect a rail violation. If a rail violation is detected, the internal diagnostic circuit 230 may activate an interrupt signal 210. The internal diagnostic circuit 230 includes a sequence delay check counter 232 configured to receive the enable signal 212, a voltage threshold signal 270, and a voltage threshold signal 272.

The memory device 260 may receive programming data 282, where the programming data 282 includes counter values 224 used by the sequence delay counter 220 and/or counter values 235 used by the sequence delay check counter 232. In some examples, the programming data 282 may include other configuration data such as the target voltage levels, the power-down voltage levels, voltage thresholds (e.g., the voltage threshold 150-1, the voltage threshold 150-2). In some examples, an integrated circuit may transmit the programming data 282 to the power supply devices 202. In some examples, the integrated circuit 104 transmits the programming data 282 via the communication bus 208. In some examples, the communication bus 208 is an I2C bus. In some examples, the integrated circuit 104 transmits the programming data 282 via the communication bus 208. In some examples, the power supply device 202 is associated with an address 292 that can uniquely identify the power supply device 202, and the programming data 282 may include the address 292 with the counter values 224 and/or the counter values 235.

Figure 3:
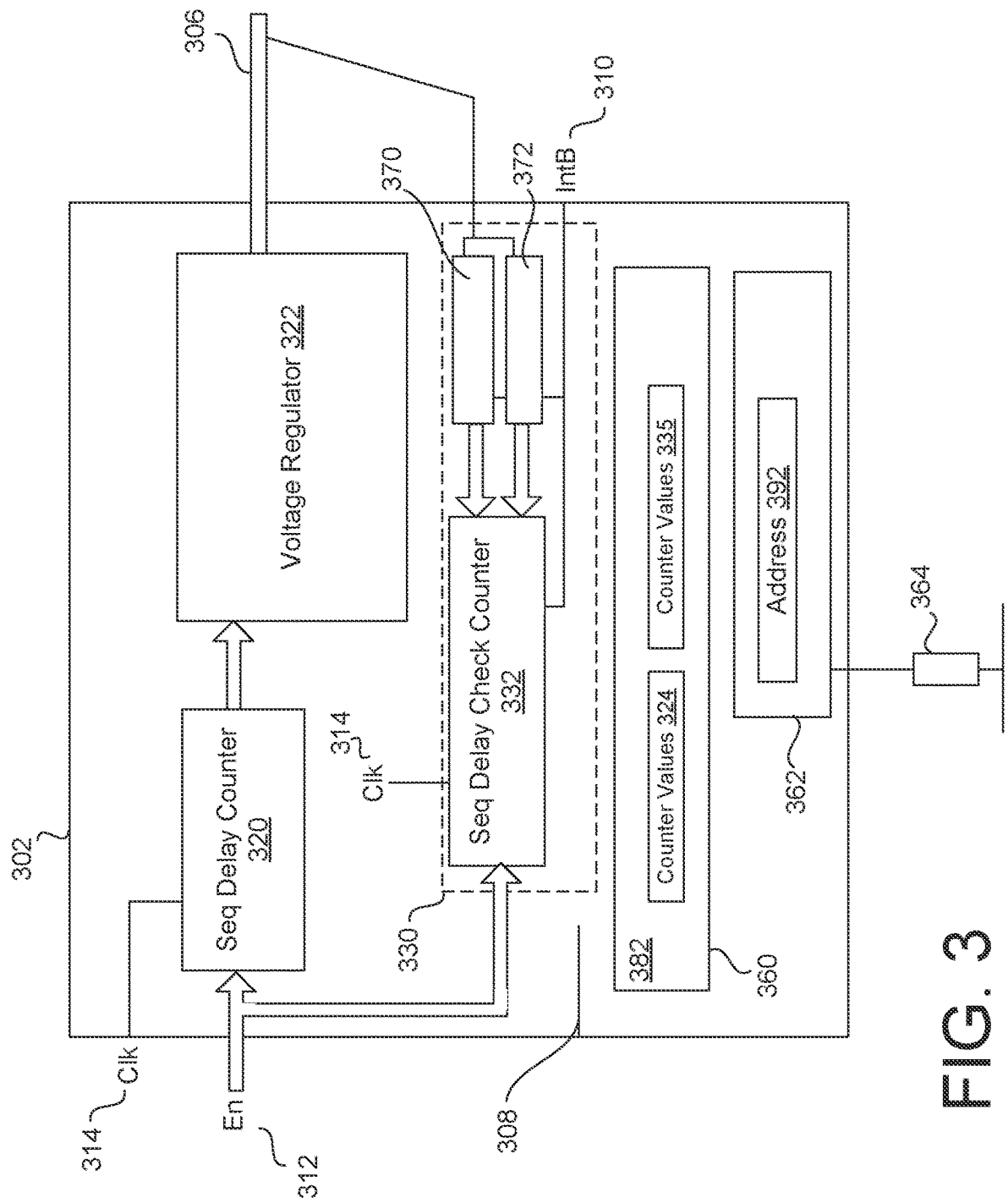
FIG. 3 illustrates another example of a power supply device for detecting a rail violation.

FIG. 3 illustrates an example of a power supply device 302 according to an aspect. The power supply device 302 may be an example of the power supply device 102 of FIGS. 1A to 1F and may include any of the details discussed with reference to those figures. The power supply device 302 includes a sequence delay counter 320, a voltage regulator 322, an internal diagnostic circuit 330, and a memory device 360. The sequence delay counter 320 may receive a clock signal 314 and an enable signal 312, and delay activation (or deactivation) of the voltage regulator 322 according to its counter values. In some examples, the power supply device 302 includes a communication bus 308. The voltage regulator 322 is configured to generate a rail voltage 306. The internal diagnostic circuit 330 may receive the enable signal 312 (and the clock signal 314), and the rail voltage 306, and detect a rail violation. If a rail violation is detected, the internal diagnostic circuit 330 may activate an interrupt signal 310. The internal diagnostic circuit 330 includes a sequence delay check counter 332 configured to receive the enable signal 312, a voltage threshold signal 370, and a voltage threshold signal 372.

The memory device 360 may receive programming data 382, where the programming data 382 includes counter values 324 used by the sequence delay counter 320 and/or counter values 335 used by the sequence delay check counter 332. In some examples, the programming data 382 may include other configuration data such as the target voltage levels, the power-down voltage levels, voltage thresholds (e.g., the voltage threshold 150-1, the voltage threshold 150-2). In some examples, the power supply device 302 is associated with an address 392 that can uniquely identify the power supply device 302. In some examples, the power supply device 302 includes an analog-to-digital converter 362 and a resistor 364. In some examples, the address 392 is defined by the analog-to-digital converter 362 and the resistor 364. The power supply device 302 may drive a current into the resistor 364, which creates a voltage that is monitored by the analog-to-digital converter 362. The analog-to-digital converter 362 may obtain a digital code and compare the digital code with hardcoded codes to define the address 392 of the power supply device 302. In some examples, changing the resistor value of the resistor 364 may change the voltage, the digital code, and therefore the address 392 of the power supply device 302.

FIG. 4 illustrates a flowchart 400 depicting example operations of a power supply system according to an aspect. Although the flowchart 400 is explained with reference to the power supply system 100 of FIGS. 1A through 1F, the operations may be implemented by any of the examples discussed herein. Although the flowchart 400 of FIG. 4 illustrates the operations in sequential order, it will be appreciated that this is merely an example, and that additional or alternative operations may be included. Further, operations of FIG. 4 and related operations may be executed in a different order than that shown, or in a parallel or overlapping fashion.

Operation 402 includes, in response to activation of an enable signal to activate the power system according to an activation power sequence, activating a power supply device to generate a rail voltage. Operation 404 includes detecting a rail violation of the activation power sequence in response to a value of the rail voltage, at a first time, not satisfying a first condition defined by a voltage threshold, or the value of the rail voltage, at a second time, not satisfying a second condition defined by the voltage threshold. Operation 406 includes, in response to the rail violation being detected, activating an interrupt signal, the interrupt signal configured to cause an integrated circuit to operate in a safe state.

In some aspects, the techniques described herein relate to a power supply system, including: a plurality of power supply devices configured to be connected to an integrated circuit, a power supply device of the plurality of power supply devices including: a voltage regulator configured to generate a rail voltage; and an internal diagnostic circuit configured to: detect activation of an enable signal to activate the plurality of power supply devices according to an activation power sequence; detect a rail violation of the activation power sequence in response to a value of the rail voltage: at a first time, not satisfying a first condition defined by a voltage threshold, or at a second time, not satisfying a second condition defined by the voltage threshold; and in response to the rail violation being detected, activate an interrupt signal.

In some aspects, the techniques described herein relate to a power supply system, wherein the first condition defined by the voltage threshold includes the value of the rail voltage being less than the voltage threshold. In some aspects, the techniques described herein relate to a power supply system, wherein the second condition defined by the voltage threshold includes the value of the rail voltage being equal to or greater than the voltage threshold.

In some aspects, the techniques described herein relate to a power supply system, wherein the voltage threshold is a first voltage threshold, the internal diagnostic circuit is configured to: detect deactivation of the enable signal to deactivate the plurality of power supply devices according to a deactivation power sequence; and detect a rail violation of the deactivation power sequence in response to the value of the rail voltage: at a third time, not satisfying a first condition defined by a second voltage threshold, or at a fourth time, not satisfying a second condition defined by the second voltage threshold.

In some aspects, the techniques described herein relate to a power supply system, wherein the first condition defined by the second voltage threshold includes the value of the rail voltage being equal to or greater than the second voltage threshold. In some aspects, the techniques described herein relate to a power supply system, wherein the second condition defined by the second voltage threshold includes the rail voltage being less than the second voltage threshold.

In some aspects, the techniques described herein relate to a power supply system, wherein the internal diagnostic circuit includes a sequence delay check counter associated with a plurality of counter values, the plurality of counter values including a first counter value corresponding to the first time and a second counter value corresponding to the second time.

In some aspects, the techniques described herein relate to a power supply system, wherein the internal diagnostic circuit includes a voltage threshold detector configured to activate or deactivate a voltage threshold signal based on a comparison of the value of the rail voltage with the voltage threshold, wherein the sequence delay check counter is configured to detect the rail violation based on whether the voltage threshold signal is activated or deactivated at the first time or the second time.

In some aspects, the techniques described herein relate to a power supply system, wherein the internal diagnostic circuit is configured to receive programming data to configure the sequence delay check counter, the programming data including the plurality of counter values. In some aspects, the techniques described herein relate to a power supply system, wherein the internal diagnostic circuit includes a memory device configured to store the plurality of counter values. In some aspects, the techniques described herein relate to a power supply system, wherein the power supply device is associated with an address, the internal diagnostic circuit including an analog-to-digital converter and a resistor, the analog-to-digital converter and the resistor configured to define the address.

In some aspects, the techniques described herein relate to a power supply device including: a voltage regulator configured to generate a rail voltage; and an internal diagnostic circuit configured to: detect activation of an enable signal to activate a plurality of power supply devices according to an activation power sequence; detect a rail violation of the activation power sequence in response to a value of the rail voltage: at a first time, not satisfying a first condition defined by a voltage threshold, or at a second time, not satisfying a second condition defined by the voltage threshold; and in response to the rail violation, activate an interrupt signal. In some aspects, the techniques described herein relate to a power supply device, wherein the first condition defined by the voltage threshold includes the value of the rail voltage being less than the voltage threshold, wherein the second condition defined by the voltage threshold includes the value of the rail voltage being equal to or greater than the voltage threshold.

In some aspects, the techniques described herein relate to a power supply device, wherein the voltage threshold is a first voltage threshold, the internal diagnostic circuit is configured to: detect deactivation of the enable signal to deactivate the plurality of power supply devices according to a deactivation power sequence; and detect a rail violation of the deactivation power sequence in response to the value of the rail voltage: at a third time, not satisfying a first condition defined by a second voltage threshold, or at a fourth time, not satisfying a second condition defined by the second voltage threshold.

In some aspects, the techniques described herein relate to a power supply device, wherein the internal diagnostic circuit includes: a sequence delay check counter associated with a plurality of counter values that correspond to the first through fourth times. In some aspects, the techniques described herein relate to a power supply device, wherein the first condition defined by the second voltage threshold includes the value of the rail voltage being equal to or greater than the second voltage threshold, wherein the second condition defined by the second voltage threshold includes the rail voltage being less than the second voltage threshold.

In some aspects, the techniques described herein relate to a method of monitoring a power sequence of a power supply system, the method including: in response to activation of an enable signal to activate a power supply system according to an activation power sequence, activating a power supply device to generate a rail voltage; detecting a rail violation of the activation power sequence in response to a value of the rail voltage: at a first time, not satisfying a first condition defined by a voltage threshold, or at a second time, not satisfying a second condition defined by the voltage threshold; and in response to the rail violation being detected, activating an interrupt signal.

In some aspects, the techniques described herein relate to a method, wherein the first condition defined by the voltage threshold includes the value of the rail voltage being less than the voltage threshold, wherein the second condition defined by the voltage threshold includes the rail voltage being greater than or equal to the voltage threshold.

In some aspects, the techniques described herein relate to a method, wherein the voltage threshold is a first voltage threshold, the method further including: detecting deactivation of the enable signal to deactivate the power supply system according to a deactivation power sequence; and detecting a rail violation of the deactivation power sequence in response to the value of the rail voltage: at a third time, not satisfying a first condition defined by a second voltage threshold, or at a fourth time, not satisfying a second condition defined by the second voltage threshold.

In some aspects, the techniques described herein relate to a method, further including: detecting, by a sequence delay check counter, activation of the enable signal; triggering, by the sequence delay check counter, a rail check in response to a period of time satisfying a counter value that represents the first time; and in response to the rail check, detecting whether the value of the rail voltage satisfies the first condition defined by the voltage threshold.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above examples are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of examples discussed herein. As used herein, the term and/or includes any and all combinations of one or more of the associated listed items.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A power supply system, comprising:
   a plurality of power supply devices configured to be connected to an integrated circuit, a power supply device of the plurality of power supply devices including:
   a voltage regulator configured to generate a rail voltage; and
   an internal diagnostic circuit configured to:
      detect activation of an enable signal to activate the plurality of power supply devices according to an activation power sequence;
      detect a rail violation of the activation power sequence in response to a value of the rail voltage:
         at a first time represented by a first counter value included in programming data, not satisfying a first condition defined by a voltage threshold, or
         at a second time represented by a second counter value, not satisfying a second condition defined by the voltage threshold; and
      in response to the rail violation being detected, activate an interrupt signal.

2. The power supply system of claim 1, wherein the first condition defined by the voltage threshold includes the value of the rail voltage being less than the voltage threshold.

3. The power supply system of claim 1, wherein the second condition defined by the voltage threshold includes the value of the rail voltage being equal to or greater than the voltage threshold.

4. The power supply system of claim 1, wherein the voltage threshold is a first voltage threshold, and wherein the internal diagnostic circuit is configured to:
   detect deactivation of the enable signal to deactivate the plurality of power supply devices according to a deactivation power sequence; and
   detect a rail violation of the deactivation power sequence in response to the value of the rail voltage:
      at a third time, not satisfying a first condition defined by a second voltage threshold, or
      at a fourth time, not satisfying a second condition defined by the second voltage threshold.

5. The power supply system of claim 4, wherein the first condition defined by the second voltage threshold includes the value of the rail voltage being equal to or greater than the second voltage threshold.

6. The power supply system of claim 4, wherein the second condition defined by the second voltage threshold includes the rail voltage being less than the second voltage threshold.

7. The power supply system of claim 1, wherein the internal diagnostic circuit includes a sequence delay check counter being configured with a plurality of counter values, the plurality of counter values including the first counter value and the second counter value.

8. The power supply system of claim 7, wherein the internal diagnostic circuit includes a voltage threshold detector configured to activate or deactivate a voltage threshold signal based on a comparison of the value of the rail voltage with the voltage threshold, and wherein the sequence delay check counter is configured to detect the rail violation based on whether the voltage threshold signal is activated or deactivated at the first time or the second time.

9. The power supply system of claim 7, wherein the internal diagnostic circuit is configured to receive the programming data to configure the sequence delay check counter, the programming data including the plurality of counter values.

10. The power supply system of claim 9, wherein the internal diagnostic circuit includes a memory device configured to store the plurality of counter values.

11. The power supply system of claim 9, wherein the power supply device is associated with an address, the internal diagnostic circuit including an analog-to-digital converter and a resistor, the analog-to-digital converter and the resistor configured to define the address.

12. A power supply device comprising:
   a voltage regulator configured to generate a rail voltage; and
   an internal diagnostic circuit configured to:
      detect activation of an enable signal to activate a plurality of power supply devices according to an activation power sequence, the power supply device not using a power management integrated circuit for controlling a power sequence of the plurality of power supply devices;
      detect a rail violation of the activation power sequence in response to a value of the rail voltage:
         at a first time, not satisfying a first condition defined by a voltage threshold, or
         at a second time, not satisfying a second condition defined by the voltage threshold; and
      in response to the rail violation, activate an interrupt signal.

13. The power supply device of claim 12, wherein the first condition defined by the voltage threshold includes the value of the rail voltage being less than the voltage threshold, and wherein the second condition defined by the voltage threshold includes the value of the rail voltage being equal to or greater than the voltage threshold.

14. The power supply device of claim 12, wherein the voltage threshold is a first voltage threshold, the internal diagnostic circuit is configured to:
   detect deactivation of the enable signal to deactivate the plurality of power supply devices according to a deactivation power sequence; and
   detect a rail violation of the deactivation power sequence in response to the value of the rail voltage:
      at a third time, not satisfying a first condition defined by a second voltage threshold, or
      at a fourth time, not satisfying a second condition defined by the second voltage threshold.

15. The power supply device of claim 14, wherein the internal diagnostic circuit includes:
a sequence delay check counter associated with a plurality of counter values that correspond to the first time through the fourth time.

16. The power supply device of claim 14, wherein the first condition defined by the second voltage threshold includes the value of the rail voltage being equal to or greater than the second voltage threshold, and wherein the second condition defined by the second voltage threshold includes the rail voltage being less than the second voltage threshold.

17. A method of monitoring a power sequence of a power supply system, the method comprising:
receiving programming data including a first counter value and a second counter value;
storing the first and second counter values in a memory device;
in response to activation of an enable signal to activate a power supply system according to an activation power sequence, activating a power supply device to generate a rail voltage;
detecting a rail violation of the activation power sequence in response to a value of the rail voltage:
at a first time represented by the first counter value, not satisfying a first condition defined by a voltage threshold, or
at a second time represented by the second counter value, not satisfying a second condition defined by the voltage threshold; and
in response to the rail violation being detected, activating an interrupt signal.

18. The method of claim 17, wherein the first condition defined by the voltage threshold includes the value of the rail voltage being less than the voltage threshold, and wherein the second condition defined by the voltage threshold includes the rail voltage being greater than or equal to the voltage threshold.

19. The method of claim 17, wherein the voltage threshold is a first voltage threshold, the method further comprising:
detecting deactivation of the enable signal to deactivate the power supply system according to a deactivation power sequence; and
detecting a rail violation of the deactivation power sequence in response to the value of the rail voltage:
at a third time, not satisfying a first condition defined by a second voltage threshold, or
at a fourth time, not satisfying a second condition defined by the second voltage threshold.

20. The method of claim 17, further comprising:
detecting, by a sequence delay check counter, activation of the enable signal;
triggering, by the sequence delay check counter, a rail check in response to a period of time satisfying a counter value that represents the first time; and
in response to the rail check, detecting whether the value of the rail voltage satisfies the first condition defined by the voltage threshold.

* * * * *